United States Patent
Thayer et al.

(10) Patent No.: US 12,327,949 B2
(45) Date of Patent: Jun. 10, 2025

(54) HEADER APPARATUS FOR VEHICLE BATTERY PACK

(71) Applicant: Rivian IP Holdings, LLC, Irvine, CA (US)

(72) Inventors: Brandon Thayer, Aliso Viejo, CA (US); Ryan Norris, Mission Viejo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 388 days.

(21) Appl. No.: 17/724,605

(22) Filed: Apr. 20, 2022

(65) Prior Publication Data

US 2023/0344169 A1    Oct. 26, 2023

(51) Int. Cl.
*H01R 13/631* (2006.01)
*H01R 13/52* (2006.01)
*H01R 25/00* (2006.01)

(52) U.S. Cl.
CPC ....... *H01R 13/631* (2013.01); *H01R 13/5219* (2013.01); *H01R 25/006* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 4,158,764 A | 6/1979 | Yane | |
| 5,110,369 A * | 5/1992 | Tornstrom | H01L 31/048 136/251 |
| 5,417,587 A * | 5/1995 | Katsuda | H01R 4/64 439/559 |
| 5,765,761 A | 6/1998 | Law et al. | |
| 9,559,346 B2 * | 1/2017 | Dollison | H01M 50/262 |
| 11,862,894 B1 * | 1/2024 | Lewis | H01M 50/262 |
| 2013/0077271 A1 * | 3/2013 | Kuhar | H01R 13/701 361/752 |
| 2015/0180178 A1 * | 6/2015 | Ranka | H01R 13/74 403/299 |
| 2017/0335751 A1 | 11/2017 | Newman | |
| 2019/0221330 A1 | 7/2019 | Fuehrer | |
| 2020/0375682 A1 | 12/2020 | Kincaid et al. | |
| 2021/0208011 A1 | 7/2021 | Takayasu | |
| 2022/0144115 A1 | 5/2022 | Hemrle et al. | |
| 2023/0084987 A1 | 3/2023 | Zoon | |
| 2023/0124670 A1 | 4/2023 | Oslislok et al. | |

OTHER PUBLICATIONS

Notice of Allowance on U.S. Appl. No. 18/147,394 dated Oct. 3, 2023.
Non-Final Office Action on U.S. Appl. No. 18/147,394 DTD Aug. 17, 2023.

* cited by examiner

Primary Examiner — Oscar C Jimenez
(74) Attorney, Agent, or Firm — Foley & Lardner LLP

(57) ABSTRACT

The present disclosure is directed to an apparatus. The apparatus can include a housing having a compression limiter. The apparatus can include a cutting fastener coupled with a portion of the compression limiter. The apparatus can include an over-molded conductive material that can couple with a portion of the housing to form a conductive path between the compression limiter and the cutting fastener.

18 Claims, 9 Drawing Sheets

HEADER APPARATUS FOR VEHICLE BATTERY PACK

INTRODUCTION

A variety of systems can include one or more connectors, such as high-voltage header, to facilitate coupling electrical components together. For example, a connector can couple with an enclosure of a battery pack.

SUMMARY

Generally, electrical connectors require an electrical grounding path. Systems and methods described herein can provide a grounding path for electrical enclosures. At least one aspect of the present disclosure is directed to a header apparatus. The header apparatus can include a housing having a compression limiter that includes at least one portion coupled with a through hole of the housing. The header apparatus can include a cutting fastener that can couple with a portion of the compression limiter. The header apparatus can include an over-molded conductive material coupled to a portion of the housing and the compression limiter such that a grounding path is formed between the cutting fastener, the compression limiter, and the over-molded conductive material. The cutting fastener can penetrate an outer coating of an enclosure such that the grounding path forms with the enclosure.

At least one aspect is directed to a header apparatus. The header apparatus can include a housing having a compression limiter, a cutting fastener coupled with a portion of the compression limiter, or an over-molded conductive material that can couple with a portion of the housing to form a conductive path between the compression limiter and the cutting fastener.

At least one aspect is directed to a method. The method can include providing a housing having a compression limiter. The method can include coupling an over-molded conductive material with a portion of the compression limiter. The method can include coupling a cutting fastener with a portion of the compression limiter to form a conductive path between the over-molded conductive material and the cutting fastener.

At least one aspect is directed to an electric vehicle. The electric vehicle can include a header apparatus. The header apparatus can include a housing having a compression limiter, a cutting fastener coupled with a portion of the compression limiter, or an over-molded conductive material that can couple with a portion of the housing to form a conductive path between the compression limiter and the cutting fastener.

At least one aspect is directed to a battery pack system. The battery pack system can include a battery pack having a battery pack housing. The battery pack system can include a header apparatus coupled with the battery pack housing. The header apparatus can include a housing having a compression limiter, a cutting fastener coupled with a portion of the compression limiter, or an over-molded conductive material that can couple with a portion of the housing to form a conductive path between the compression limiter, the cutting fastener, and the battery pack housing.

At least one aspect is directed to a method. The method can include providing a header apparatus. The header apparatus can include a housing having a compression limiter, a cutting fastener coupled with a portion of the compression limiter, or an over-molded conductive material that can couple with a portion of the housing to form a conductive path between the compression limiter and the cutting fastener.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
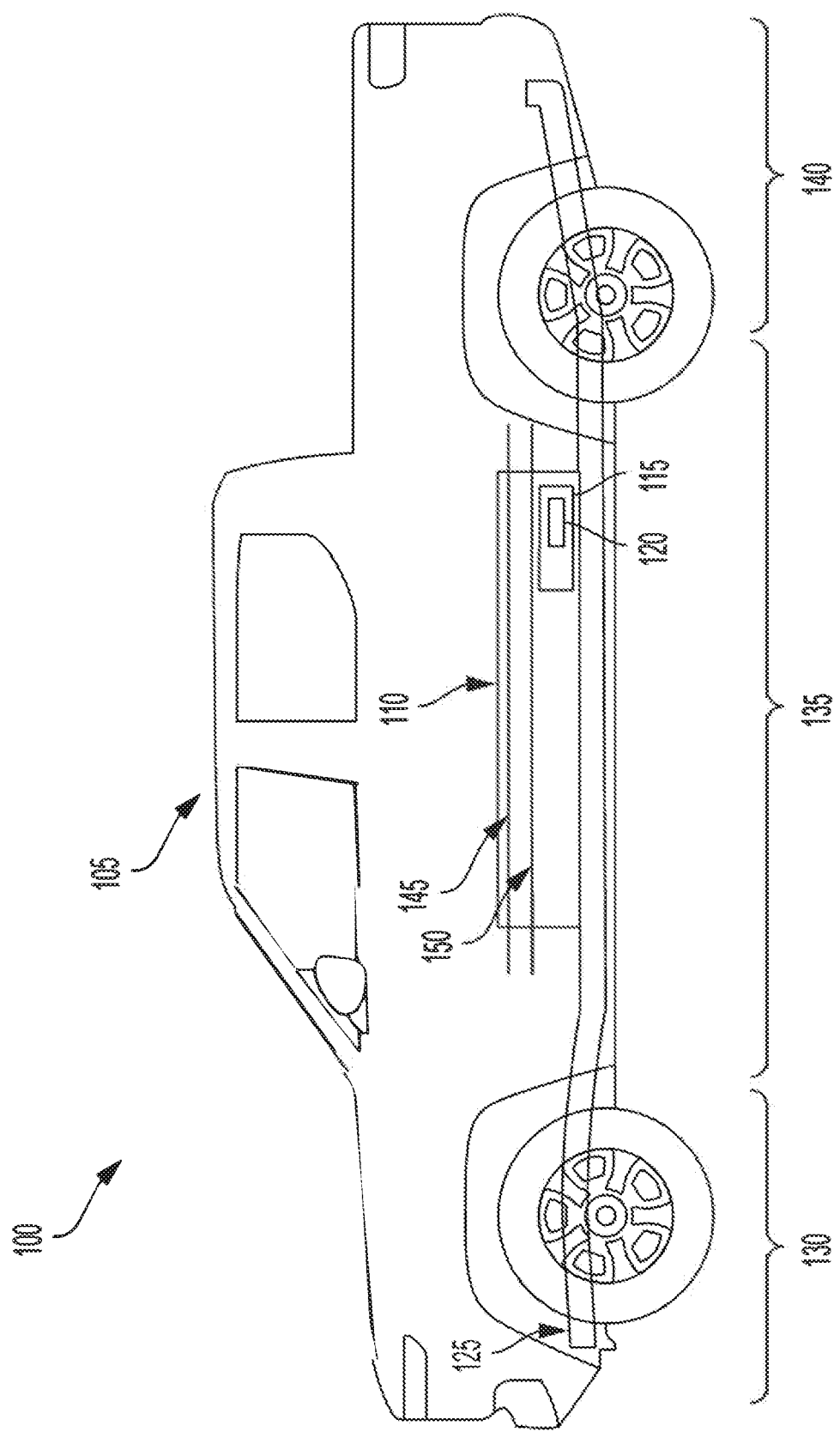
FIG. 1 depicts an example electric vehicle, in accordance with implementations.

Following below are more detailed descriptions of various concepts related to, and implementations of, methods, apparatuses, and systems of providing a grounding path through a header apparatus. The various concepts introduced above and discussed in greater detail below may be implemented in any of numerous ways.

The present disclosure is directed to systems and methods of providing a grounding path (e.g., a conductive path) through a header apparatus. The apparatus can include a housing having a compression limiter. For example, the compression limiter can include at least one portion coupled with a through hole of the housing. The apparatus can include a cutting fastener that can couple with a portion of the compression limiter. For example, the through hole of the compression limiter within the through hole of the housing can receive a portion of the cutting fastener. The apparatus can include a conductive material that is molded over a portion of the housing (e.g., the over-molded portion).

The over-molded portion can contact a portion of the compression limiter. The cutting fastener, the compression limiter, and the over-molded portion can each include at least one conductive portion such that a grounding path is formed between the cutting fastener, the compression limiter, and the over-molded portion. The cutting fastener can penetrate an outer coating (e.g., an E-coating) of a battery pack housing such that the grounding path forms with the battery pack housing.

The disclosed solutions have a technical advantage of providing an electrical connection (e.g., electrical grounding pathway) between a high voltage header for power electronics and an enclosure having an E-coating. For example, a battery pack enclosure for an electric vehicle can include an outer layer of E-coating or powder coating that results in electrical isolation (e.g., no grounding path) between the enclosure and a header coupled with the enclosure. The disclosed solutions provide a plastic header assembly having an over-molded conductive material in the plastic that makes contact with a conductive compression limiter embedded in the plastic. When assembled with a cutting fastener that penetrates the coating of the enclosure, an electrical conductive path is formed between the over-molded conductive material, the compression limiter, the cutting fastener, and the enclosure. The disclosed solutions provide a gap between the cutting fastener and the compression limiter or between the cutting fastener and the enclosure such that the gap receives debris resulting from penetrating the coating. This has a technical advantage of providing an electrical connection without interfering with a seal of the header. The disclosed solutions have a technical advantage of providing an electrical connection (e.g., electrical grounding pathway) without the need for additional cutting of the enclosure (e.g., without teeth cutting into the coating). Further, the disclosed solutions can reduce or eliminate the need for pre- or post-processing of the enclosure to clear the coating. This can result in reduced process complexity, while still providing a reliable solution.

FIG. 1 depicts is an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Yet, it should also be noted that battery pack 110 may also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery modules 115 or the battery cells 120 with other electrical components of the electric vehicle 105 to provide electrical power to various systems or components of the electric vehicle 105.

Figure 2:
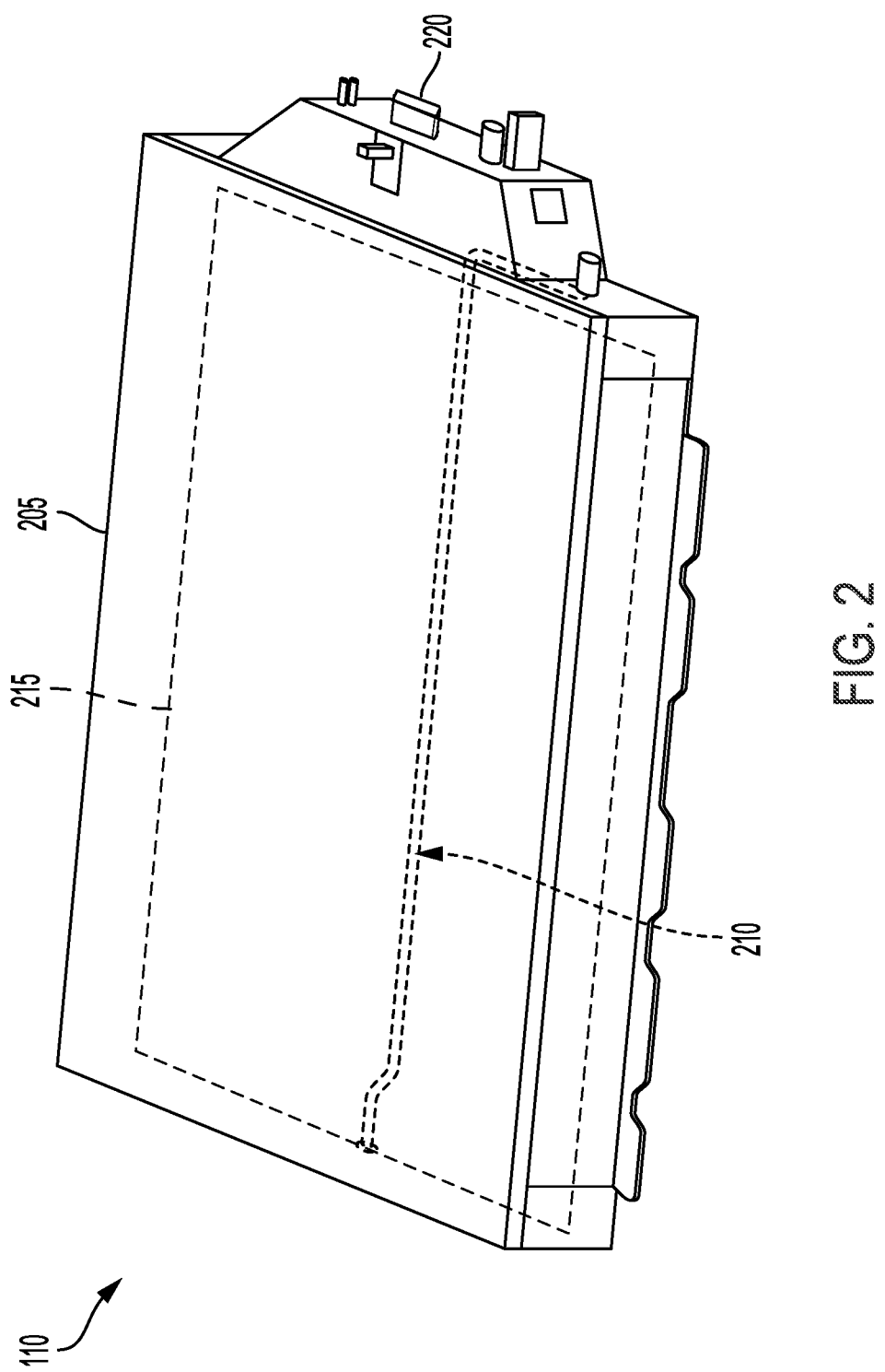
FIG. 2 depicts an example battery pack, in accordance with implementations.

FIG. 2 depicts an example battery pack 110. Referring to FIG. 2, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The housing 205 can include a shield on the bottom and/or underneath the battery module 115 to protect the battery module 115 from external conditions, particularly if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one cold plate 215. In some instances, the cold plate 215 may be positioned in relation to a top submodule and a bottom submodule, such as in between the top and bottom submodules, among other possibilities. The battery pack 110 can include any number of cold plates 215. For example, there can be one or more cold plates 215 per battery pack, or per battery module 115. The cooling line 210 can be coupled with, part of, or independent from the cold plate 215.

The battery modules 115 can each include a plurality of battery cells 120. The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule and a bottom submodule, possibly with a cold plate 215 in between the top submodule and the bottom submodule. The battery pack 110 can include or define a plurality of areas for positioning of the battery module 115. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Battery cells 120 have a variety of form factors, shapes, or sizes. For example, battery cells 120 can have a cylindrical, rectangular, square, cubic, flat, or prismatic form factor. Battery cells 120 can be assembled, for example, by inserting a winded or stacked electrode roll (e.g., a jelly roll) including electrolyte material into at least one battery cell housing. The electrolyte material, e.g., an ionically conductive fluid or other material, can generate or provide electric power for the battery cell 120. A first portion of the electrolyte material can have a first polarity, and a second portion of the electrolyte material can have a second polarity. The housing can be of various shapes, including cylindrical or rectangular, for example. Electrical connections can be made between the electrolyte material and components of the battery cell 120. For example, electrical connections with at least some of the electrolyte material can be formed at two points or areas of the battery cell 120, for example to form a first polarity terminal (e.g., a positive or anode terminal) and a second polarity terminal (e.g., a negative or cathode terminal). The polarity terminals can be made from electrically conductive materials to carry electrical current from the battery cell 120 to an electrical load, such as a component or system of the electric vehicle 105.

For example, the battery cell 120 can include a lithium-ion battery cells. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Yet further, some battery cells 120 can be solid state battery cells and other battery cells 120 can include liquid electrolytes for lithium-ion battery cells.

Figure 3:
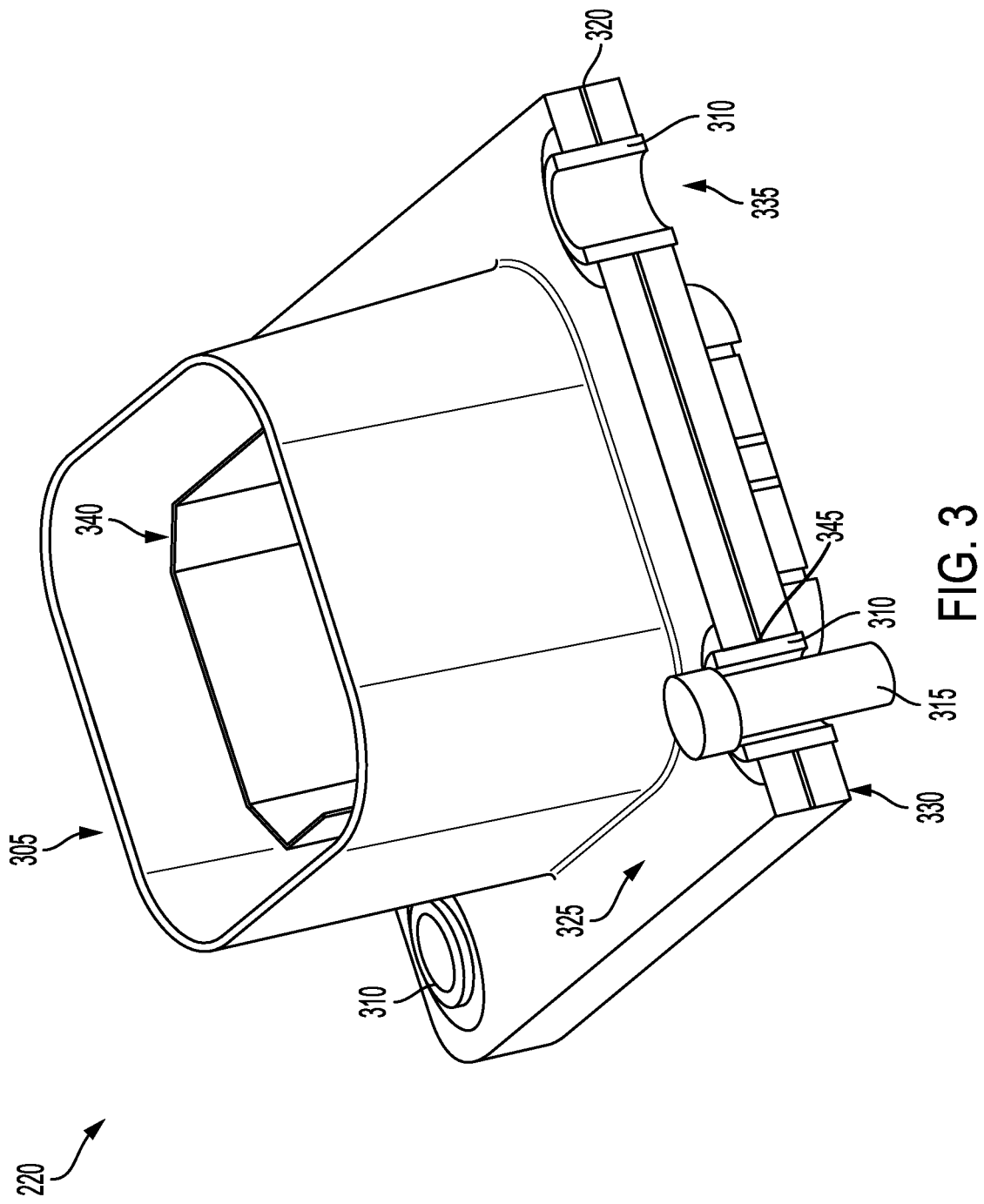
FIG. 3 depicts an example perspective view of a portion of a header apparatus, in accordance with implementations.

FIG. 3 depicts an example perspective view of an apparatus 220. The apparatus 220 can be a header apparatus 220 (e.g., a connector apparatus). For example, the header apparatus 220 can be or can include one or more connectors, plugs, or receptacles capable of coupling one or more components (e.g., cables, busbars, or other components) with a high voltage ("HV") or high electrical interference system. The header apparatus 220 can facilitate coupling one or more electrical components of the vehicle 105 (e.g., a drive unit, an inverter, a motor, an air conditioning unit, a heater, an AC charger, or other electrical components) with one or more components of the battery pack 110 (e.g., a battery management system ("BMS"), the battery cells, or another component) such that electrical current or signals can flow between a component of the battery pack 110 and one or more electrical components of the vehicle 105 disposed outside of the battery pack housing 205. For example, the header apparatus 220 can couple with a portion of the housing 205 of the battery pack 110 such that at least a portion of the header apparatus 220 is exposed to an area exterior to the battery pack housing 205, as shown in at least FIG. 2. The header apparatus 220 can include or can couple with one or more portions interior to the battery pack housing 205 (e.g., the header apparatus 220 can extend within an internal portion of the battery pack housing 205). The header apparatus 220 can couple with various other systems or appliances. For example, the header apparatus 220 can couple one or more electrical components with an inverter, a compressor (e.g., an alternating current "AC" compressor), a heater, or another device. As an example, the header apparatus 220 can couple with any device that uses a shielded cable or enclosure (e.g., an electrical cable enclosed by one or more insulated layers, a component having a faraday shield, a component having a coated exterior, or another component).

The header apparatus 220 can include at least one housing 305. For example, the housing 305 can include one or more non-metallic materials that at least partially surround or couple one or more components of the apparatus 220 to one another. The housing 305 of the header apparatus 220 can include one or more portions that couple with the housing 205 of the battery pack 110, for example. The housing 305 can be formed from one or more materials including, but not limited to, plastics (e.g., polyamide, nylon, polyamide 66 ("PA66'), polymer, polybutylene terephthalate ("PBT"), acrylonitrile butadiene styrene ("ABS"), polycarbonate ("PC"), polyethylene ("PE"), polypropylene ("PP"), polyethylene terephthalate ("PETE"), polyvinyl chloride ("PVC"), or other plastics), or other non-metallic materials. The housing 305 can be formed in a variety of ways including, but not limited to, molding (e.g., injection molding, compression molding, or other forms of molding), extrusion, subtractive manufacturing, additive manufacturing (e.g., 3D printing), or other types of manufacturing. The housing 305 can be or can include at least one external layer (e.g., a layer exposed to an external portion of the battery pack housing 205) of the apparatus 220 formed of a non-conductive material. For example, the housing 305 can include a top surface 325 and one or more portions extending from the top surface 325. The housing 305 can include one or more metallic materials.

The housing 305 can include at least one aperture, hole, slot, opening, or other component that can receive a fastener 315. For example, the housing 305 can include one or more through holes (shown by hole 335). The housing 305 can include any amount of through holes. For example, the housing 305 can include four through holes. The housing 305 can include four through holes each positioned along the top surface 325 of the housing 305. At least one through hole can receive a fastener 315. For example, each through hole can receive a fastener 315. The fasteners 315 can facilitate coupling the housing 305 with a portion of a battery pack 110. For example, the fasteners 315 can facilitate coupling the housing 305 of the apparatus 220 with a portion of the housing 205 of the battery pack 110.

The housing 305 can include at least one compression limiter 310. The compression limiter 310 can be or can include one or more materials coupled with, or integrally formed with, the housing 305 to facilitate strengthening the housing 305. For example, the compression limiter 310 can include at least one material that extends within a portion of a through hole to support the geometry of the through hole.

The compression limiter 310 can facilitate receiving a load (e.g., a compression load) applied to one or more portions of the apparatus 220, such as the housing 305, to support the structural integrity of the housing 305. For example, the compression limiter 310 can include at least one material that surrounds a portion of an inner diameter of a through hole of the housing 305 (e.g., such that the compression limiter 310 includes a through hole). The compression limiter 310 can include material that surrounds an entire inner diameter of the through hole, as an example. The compression limiter 310 can include one or more portions that can receive, abut, contact, or otherwise position near to one or more fasteners 315. The compression limiter 310 can surround a portion of the through holes such that the compression limiter 310 facilitates maintaining the structural integrity of the through hole when a compression load is applied to the through hole (e.g., by the fastener 315).

The compression limiter 310 can include one or more conductive materials. For example the compression limiter 310 can be formed from one or more metals (e.g., steel, aluminum, brass, or other metals). The compression limiter 310 can include a conductive material such that a conductive path can be formed with one or more portions of the compression limiter 310. For example, the compression limiter 310 can include one or more materials that allow a path for current to flow when in contact with another conductive material. As an example, the compression limiter 310 can include one or more metals coupled with one or more plastic portions of the housing 305.

The apparatus 220 can include at least one conductive material 320 coupled with a portion of the housing 305. For example, the conductive material 320 can be molded with a portion of the housing 305. The conductive material 320 can be over-molded onto a portion of the housing 305. For example, the conductive material 320 can be formed with a portion of the housing 305 via one or more molding techniques or one or more additive manufacturing techniques (e.g., 3D printing or jetting). The housing 305 can form a substrate in which the conductive material 320 is over-molded onto, as an example. For example, the conductive material 320 can be formed using a multi-step injection molding process where two or more components are molded over top of one another (e.g., conductive material 320 molded over housing 305). The conductive material 320 can couple with a portion of the housing 305 in a variety of other ways including, but not limited to, conductive molding, welding, adhesives, or fasteners. The over-molded conductive material 320 can be formed from one or more materials including, but not limited to, steel, aluminum, copper, brass, or other conductive materials. The over-molded conductive material 320 can include one or more insulating materials. The over-molded conductive material 320 can over-mold onto a portion of the housing 305 such that at least a portion of the over-molded conductive material 320 conforms to a profile of a portion of the housing 305. For example, the over-molded conductive material 320 can at least partially match a portion of the housing 305.

The over-molded conductive material 320 can include one or more materials that extend throughout a portion of the housing 305. For example, the over-molded conductive material 320 can include at least one material that extends within the housing 305 between the top surface 325 and a bottom surface 330 and at an angle to an axial direction of the through holes or the compression limiter 310 to support the geometry of the housing 305. For example, the over-molded conductive material 320 can include at least one surface that extends throughout the housing 305 at an approximate midpoint between the top surface 325 and the bottom surface 330. The bottom surface 330 can at least partially oppose the top surface 325. The over-molded conductive material 320 can include at least one surface that is at least partially embedded within a portion of the material of the housing 305 (e.g., a surface that extends at an angle relative to the through hole between the top surface 325 and the bottom surface 330).

As shown in FIG. 3, and among others, the over-molded conductive material 320 can contact a portion of the compression limiter 310, shown by contact point 345. For example, the over-molded conductive material 320 can couple, contact, abut, or position next to a portion of the compression limiter 310 such that the over-molded conductive material 320 at least partially contacts the compression limiter 310.

The apparatus 220 can include at least one grounding shield material 340 coupled with a portion of the housing 305. The shield material 340 can couple with an interior portion of the housing 305 (e.g., a center portion of the housing 305, a portion disposed below the bottom surface 330, or a portion that is not exposed to an exterior of the housing 305). The shield material 340 can be or can include one or more conductive materials including, but not limited to, steel, aluminum, copper, or another metal. The shield material 340 can include one or more non-metals. The shield material 340 can couple with a portion of the housing 305 and with a portion of the over-molded conductive material 320 such that the shield material 340 can form a conductive path between the over-molded conductive material 320 and another portion of the battery pack 110. The shield material 340 can couple with the housing 305 in a variety of ways. For example, the shield material 340 can couple to the housing 305 by a flange or clip. The shield material 340 can couple to the housing 305 by one or more welded joints, adhesives, or fasteners, as another example. The shield material 340 can be molded with the housing 305, as yet another example.

Figure 4:
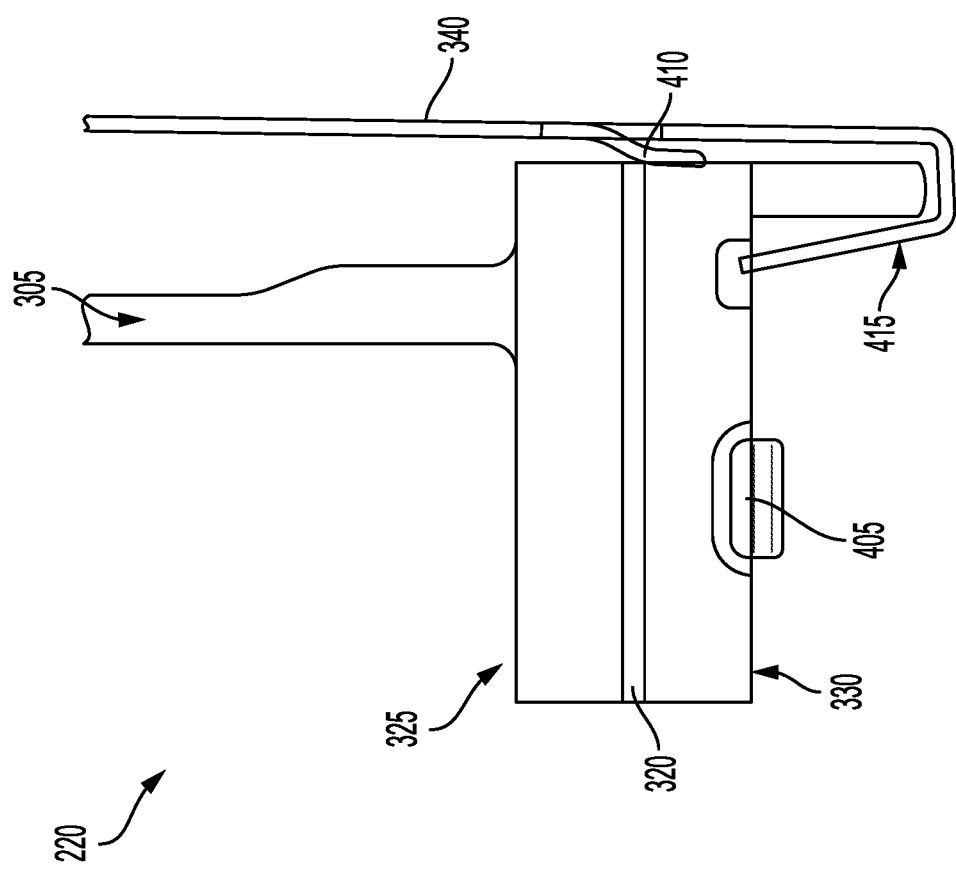
FIG. 4 depicts an example cross-sectional view of a portion of the header apparatus of FIG. 3, in accordance with implementations.

FIG. 4 depicts an example cross-sectional view of a portion of the apparatus 220. For example, FIG. 4 depicts an example cross-sectional view of one half of the apparatus 220 (e.g., a left-hand side portion of the apparatus 220). As shown in FIG. 4, and among others, the over-molded conductive material 320, or the shield material 340, can couple with various portions of the housing 305. For example, the over-molded conductive material 320 can couple to an interior portion of the housing 305 such that the over-molded conductive material 320 is disposed within the plastic of the housing 305 (e.g., within the housing 305 at a point between the top surface 325 and the bottom surface 330). The over-molded conductive material 320 can be disposed within the housing 305 such that at least a portion of the housing 305 (e.g., of plastic) is positioned above and below the over-molded conductive material 320. Positioning the over-molded conductive material 320 within the housing 305 can include numerous advantages over typical systems. For example, disposing the over-molded conductive material 320 within the housing 305 can provide a protected conductive pathway as compared to systems in which a conductive material is exposed to an exterior surface (e.g., the top surface 325) of a housing.

The shield material 340 can couple with a portion of the housing 305 disposed below the bottom surface 330. The shield material 340 can couple with a portion of the housing 305 disposed above the top surface 325. For example, the shield material 340 can extend from a portion of the housing 305 positioned above the top surface 325 to a portion of the housing 305 positioned below the bottom surface 330. The shield material 340 can include at least one flange portion 415. For example, the flange portion 415 can contact a portion of the bottom surface 330. The flange portion 415 can include one or more concave portions to at least partially surround a portion of the housing 305. For example, the flange portion 415 can include a substantially "J," "U," or "V" shape to surround a portion of the housing 305. The flange portion 415 can facilitate coupling the shield material 340 with the housing 305. For example, the flange portion 415 can compress one or more portions of the housing 305.

The shield material 340 can include a protrusion, extension, or other feature that contacts a portion of the over-molded conductive material 320. For example, the shield material 340 can include a spring 410. The spring 410 can be or can include any material that protrudes or biases toward a portion of the over-molded conductive material 320. For example, the spring 410 can extend from a portion of the shield material 340 such that, when the shield material 340 is coupled with the housing 305, the spring 410 extends toward the over-molded conductive material 320 embedded within the housing 305 to make contact with the over-molded conductive material 320. The shield material 340 and the over-molded conductive material 320 can include one or more conductive materials such that, when the shield material 340 contacts a portion of the over-molded conductive material 320, a conductive path is formed between the over-molded conductive material 320 and the shield material 340. For example, the over-molded conductive material 320 can establish an electrical connection with the shield material 340 such that electrical current can flow between the over-molded conductive material 320 and the shield material 340.

The apparatus 220 can include at least one seal 405. For example, the seal 405 can be or can include any material or component that facilitates coupling the apparatus 220 with another component, such as the housing 205 of the battery pack 110. The seal 405 can be or can include, for example, one or more gaskets, O-rings, radial seals, axial seals, or another type of seal. The seal 405 can include one or more non-metallic materials including, but not limited to, elastomers. The seal 405 can include one or more metallic materials. When coupled with the housing 205 of the battery pack 110 the seal 405 can facilitate inhibiting liquid or other fluid flow between a portion of the battery pack housing 205 and a portion of the apparatus housing 305. For example, the seal 405 can compress between a portion of the housing 305 of the apparatus 220 and a portion of the housing 205 of the battery pack 110. The over-molded conductive material 320 and the shield material 340 can position such that the over-molded conductive material 320 and the shield material 340 do not interfere with the sealing path of the seal 405 (e.g., do not interfere with functionality of the seal 405 to form a liquid-tight seal between a portion of the housing 305 of the apparatus 220 and a portion of the housing 205 of the battery pack 110).

Figure 5:
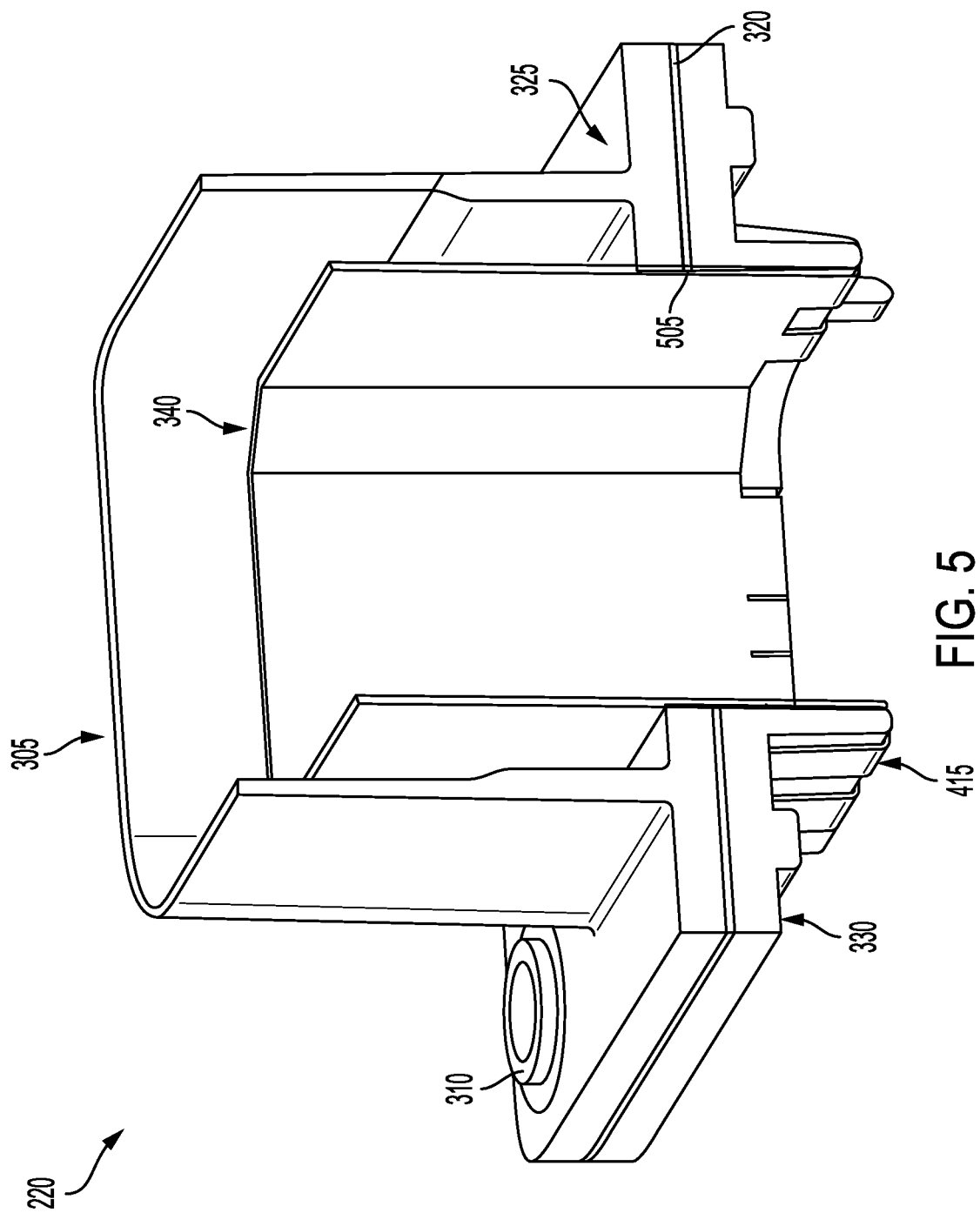
FIG. 5 depicts an example cross-sectional view of a portion of the header apparatus of FIG. 3, in accordance with implementations.

FIG. 5 depicts an example perspective cross-sectional view of the apparatus 220. As shown in FIG. 5, and among others, the shield material 340 can include one or more portions that contact a portion of the over-molded conductive material 320 (e.g., shown as contact point 505). For example, the shield material 340 can include a protrusion that contacts a portion of the over-molded conductive material 320. The shield material 340 may not include a protrusion, as another example. For example, the shield material 340 can include one or more flat surfaces, apertures, or other features that make contact with a portion of the over-molded conductive material 320.

As shown in FIG. 5, and among others, the shield material 340 can extend above a first side of the over-molded conductive material 320 (e.g., a side closest to the top surface 325). The shield material 340 can extend below a second side of the over-molded conductive material 320 (e.g., a side closest to the bottom surface 330). The over-molded conductive material 320 can extend at least partially within an interior portion of the housing 305 (e.g., at a position between the top surface 325 and the bottom surface 330).

Figure 6:
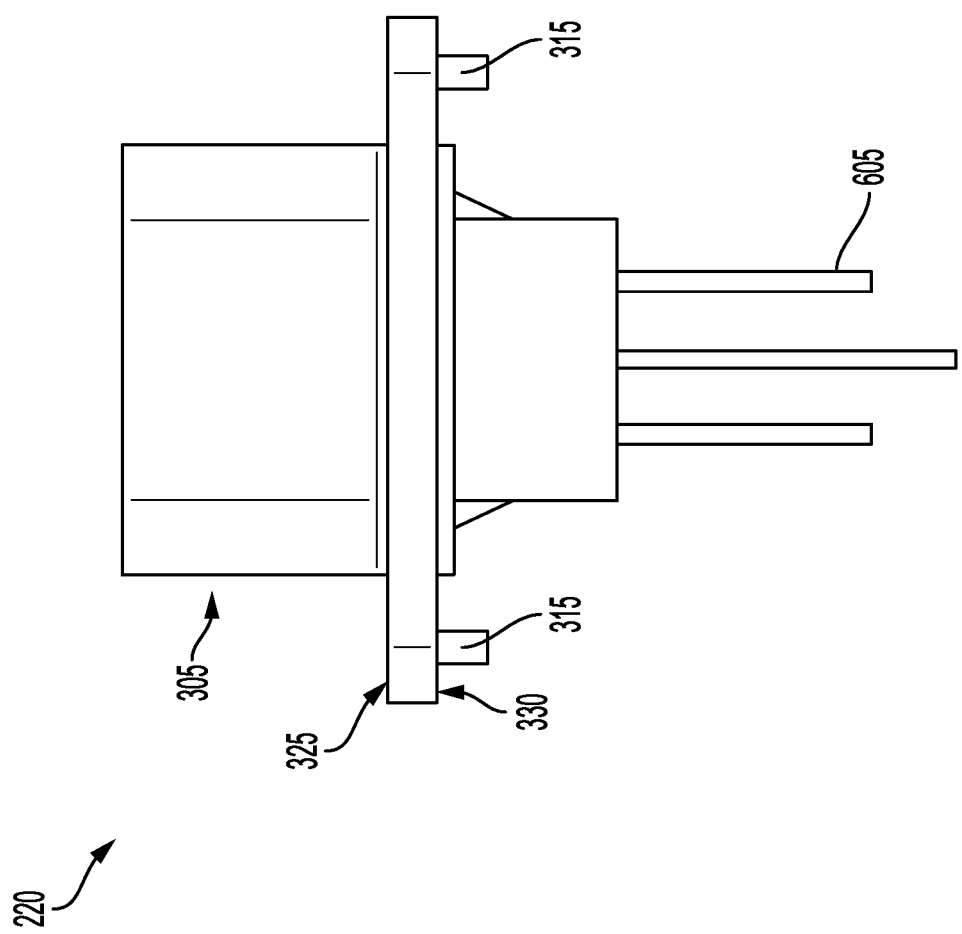
FIG. 6 depicts an example front view of a portion of the header apparatus of FIG. 3, in accordance with implementations.

FIG. 6 depicts an example front view of a portion of the apparatus 220. The apparatus 220 can include, or can couple with, one or more busbars connectors 605. For example, the apparatus 220 can include one or more connectors to facilitate coupling a portion of the apparatus 220, such as the housing 305 or shield material 340, with a busbar connector 605. The busbar connectors 605 can be or can include one or more materials to provide an electrical pathway to another component, such as a component interior to the battery pack housing 205. For example, the busbar connector 605 can couple with a portion of the shield material 340. The housing 205 of the battery pack 110 can include one or more holes, openings, or apertures to receive a portion of the apparatus 220. The housing 205 can receive a portion of the apparatus 220 such that one or more portions of the apparatus 220 extend into the battery pack 110 (e.g., beyond an outer surface of the housing 205). For example, a portion of the bottom surface 330 of the housing 305 can abut an outer surface (e.g., surface 715 shown in at least FIG. 7) of the housing 205 of the battery pack 110 such that one or more portions of the apparatus 220 disposed below the bottom surface 330 (e.g., a portion of the shield material 340, the busbar connectors 605, or another portion) can extend beyond the outer surface of the housing 205. The busbar connectors 605 can be formed from various conductive materials including, but not limited to, copper, brass, aluminum, or steel.

Figure 7:
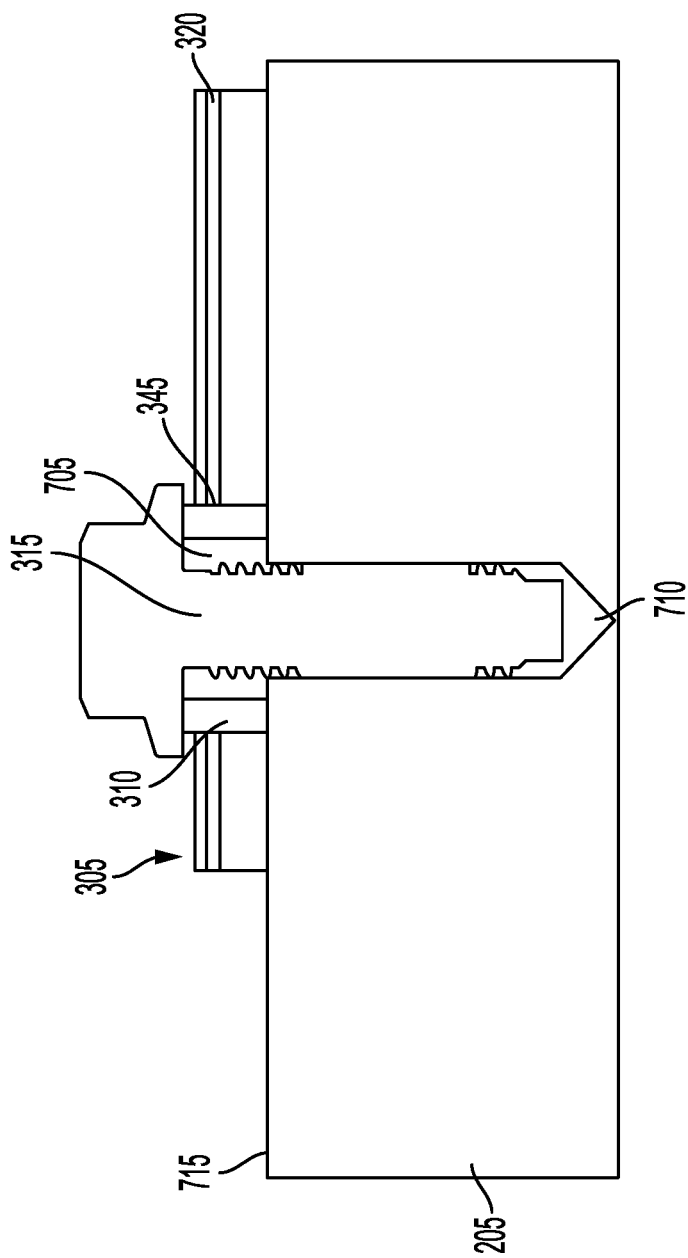
FIG. 7 depicts an example cross-sectional view of a portion of the header apparatus of FIG. 3 coupled with a battery pack, in accordance with implementations.

The apparatus 220 can couple with a portion of the housing 205 of the battery pack 110. FIG. 7 depicts an example cross-sectional view of a fastener 315 coupled with a portion of the apparatus 220 (e.g., with the housing 305 and compression limiter 310) and a portion of the battery pack housing 205. For example, the through hole of the housing 305 can receive the fastener 315 such that a head portion of the fastener 315 is positioned above or proximate the top surface 325 and a threaded portion of the fastener 315 extends beyond the through hole (e.g., past the bottom surface 330) to engage with a portion of the housing 205 of the battery pack 110. The housing 305 can include four through holes that each receive a fastener 315. Each fastener 315 can be the same (e.g., in size or shape). One or more of the fasteners 315 can differ in size or shape, as another example.

The fastener 315 can be or can include various types of fasteners. For example, the fastener 315 can be a cutting fastener 315 (e.g., cutting screw or bolt, paint-cutting screw or bolt, self-tapping screw, machine screws, or another type of cutting fastener). The cutting fastener 315 can include a sharp end portion to cut through one or more portions of the battery pack housing 205. For example, the housing 205 can include one or more layers of coating (e.g., E-coating, powder coating, paint, or other coats) applied to the housing 205. The cutting fastener 315 can include a sharp portion (e.g., a portion that can penetrate through the coating) to at least partially remove a portion of the coating layer when the fastener 315 is coupled with the housing 205.

The fastener 315 can make contact with a portion of the compression limiter 310. For example, a head portion of the fastener 315, or another portion of the fastener 315, can contact a portion of the compression limiter 310 that is adjacent to the through hole of the housing 305, as shown in at least FIG. 7. The fastener 315 can include one or more conductive materials. For example, the fastener 315 can be made from a variety of metals including, but not limited to, steel, aluminum, brass, or copper. When coupled with the housing 305 (e.g., when received by the through hole), the fastener 315 can form an electrical connection with the compression limiter 310 (e.g., electrical current can flow between the fastener 315 and the compression limiter 310 as the fastener 315 contacts a portion of the compression limiter 310). A conductive path can form between the over-molded conductive material 320, the compression limiter 310, and the fastener 315. When coupled with the housing 205 of the battery pack 110, the conductive path can form between the over-molded conductive material 320, the compression limiter 310, the fastener 315, and the housing 205. For example, an electrical connection is established between the over-molded conductive material 320, the compression limiter 310, the fastener 315, and the housing 205 such that electrical current can flow between one or more of the over-molded conductive material 320, the compression limiter 310, the fastener 315, and the housing 205.

A gap can form at one or more portions between the fastener 315, the compression limiter 310, or the housing 205 of the battery pack 110. For example, an outer diameter of the fastener 315 can be less than or equal to an inner diameter of the through hole (e.g., an inner diameter of the portion of the compression limiter 310 that surrounds the inner diameter of the through hole) such that a gap 705 forms between the fastener 315 and the compression limiter 310. As another example, an aperture of the battery pack housing 205 that receives a portion of the fastener 315 can include a length that is greater than or equal to an axial length of a portion of the fastener 315 that is received within the aperture such that a gap 710 forms between an end portion of the fastener 315 and the end portion of the aperture. For example, the aperture can include one or more portions that do not make contact with the fastener 315 when the fastener 315 is coupled with the battery pack housing 205.

The fastener 315 can cause one or more portions of the coating to move into a portion of at least one gap when the fastener 315 penetrates the coating. For example, the fastener 315 can cut through or push through the layer of material to cause particles, sediment, or other debris of the housing 205 to form around the fastener 315. The one or more gaps can receive a portion of the debris such that the debris does not interfere with the formation of the conductive path between the fastener 315, the battery pack housing 205, or the compression limiter 310. The one or more gaps can receive a portion of the debris such that the debris does not interfere with the seal 405, as another example.

Figure 8:
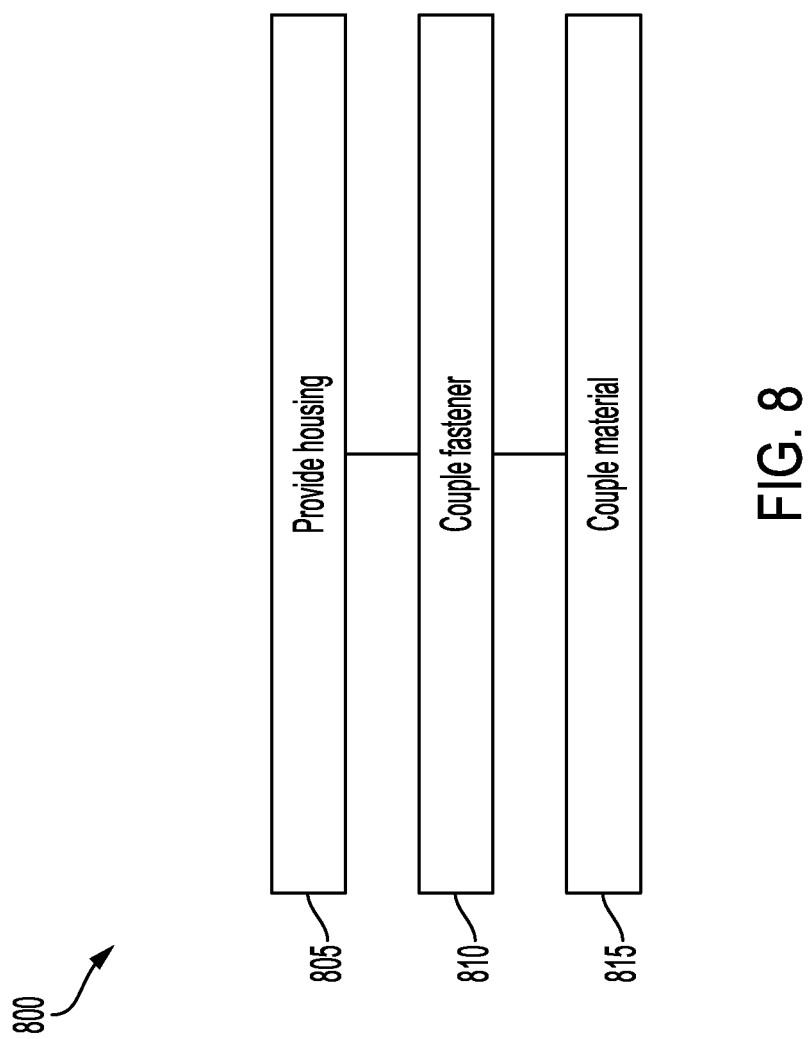
FIG. 8 depicts an example illustration of a process or providing a conductive path, in accordance with implementations.

FIG. 8 depicts an example method 800 of providing an electrical conductive path (e.g., providing a pathway for electrical current to flow between conductive materials).

The method 800 can include providing a housing 305, as depicted in act 805. For example, the housing 305 can be or can include a non-conductive material (e.g., plastic) at least partially surrounding one or more components of the apparatus 220. The housing 305 can include at least one compression limiter 310 coupled with the housing 305. For example, the compression limiter 310 can include one or more materials coupled with a portion of the housing 305 to support the housing 305 upon the housing 305 receiving a load (e.g., when fastened to the housing 205 of the battery pack 110). The compression limiter 310 can at least partially extend within a through hole of the housing 305 that receives a fastener 315, for example.

The method 800 can include coupling a material 320 with a portion of the housing 305, as depicted in act 810. For example, the material 320 can include one or more conductive materials including, but not limited to, steel, aluminum, copper, or brass. The conductive material 320 can couple with the housing 305 in a variety of ways. For example, the conductive material 320 can be molded over the housing 305 via one or more molding techniques (e.g., injection molding or another molding technique). The over-molded conductive material 320 can at least partially extend laterally through a portion of the housing 305 (e.g., in a direction that is substantially perpendicular to an axial direction of the through hole of the housing 305 that receives the fastener 315).

The housing 305 can include at least one shield material 340. The shield material 340 can couple with a portion of the housing 305 disposed below the bottom surface 330 or disposed above the top surface 325. For example, the shield material 340 can extend from a portion of the housing 305 positioned above the top surface 325 to a portion of the housing 305 positioned below the bottom surface 330. The shield material 340 can terminate at a flange portion 415 such that the flange portion 415 can contact a portion of the bottom surface 330. For example, the flange portion 415 can contact an opening, an aperture, a divot, or another portion of the bottom surface 330. The flange portion 415 can include one or more concave portions to at least partially surround a portion of the housing 305. For example, the flange portion 415 can include a substantially "J," "U," or "V" shape to surround a portion of the housing 305. The flange portion 415 can facilitate coupling the shield material 340 with the housing 305. For example, the flange portion 415 can compress one or more portions of the housing 305.

The over-molded conductive material 320 can include one or more portions that contact a portion of the compression limiter 310, shown by contact point 345. For example, the over-molded conductive material 320 can include a surface, aperture, protrusion, extension, or other feature that contacts a portion of the compression limiter 310. The shield material 340 can include at least one portion that contacts the over-molded conductive material 320. For example, the shield material 340 can include a surface, aperture, protrusion (e.g., spring 410), extension, or other feature that contacts a portion of the over-molded conductive material 320. The spring 410 can be or can include any material that biases or extends toward a portion of the over-molded conductive material 320. For example, the spring 410 can extend from a portion of the shield material 340 such that, when the shield material 340 is coupled with the housing 305, the spring 410 extends toward the over-molded conductive material 320 embedded within the housing 305 to make contact with the over-molded conductive material 320.

The over-molded conductive material 320, the shield material 340, or the compression limiter 310 can position such that the over-molded conductive material 320, the shield material 340, and the compression limiter 310 do not interfere with a sealing path of a seal 405 of the apparatus 220 (e.g., do not interfere with functionality of the seal 405 to form a liquid-tight seal between a portion of the housing 305 of the apparatus 220 and a portion of the housing 205 of the battery pack 110). For example, when coupled with a housing 205 of a battery pack 110 the seal 405 can facilitate inhibiting liquid or air flow between a portion of the battery pack housing 205 and a portion of the apparatus housing 305. For example, the seal 405 can compress between a portion of the housing 305 of the apparatus 220 and a portion of the housing 205 of the battery pack 110.

The method 800 can include coupling a fastener 315 with a portion of the housing 305, as depicted in act 815. For example, a through hole of the housing 305 can receive the fastener 315. The through hole of the housing 305 can receive the fastener 315 such that the fastener 315 makes contact with a portion of the compression limiter 310 that at least partially abuts the through hole. For example, the compression limiter 310 can receive a portion of the fastener 315. The fastener 315 can include one or more conductive materials including, but not limited to, steel, aluminum, brass, or copper. The over-molded conductive material 320 and the compression limiter 310 can include one or more conductive materials such that, when the over-molded conductive material 320 contacts a portion of the compression limiter 310, a conductive path is formed between the over-molded conductive material 320 and the compression limiter 310. For example, the over-molded conductive material 320 can establish an electrical connection with the compression limiter 310 such that electrical current can flow between the over-molded conductive material 320 and the compression limiter 310. The conductive path can form with the fastener 315 when the compression limiter 310 receives a portion of the fastener 315. For example, the conductive path can form between the over-molded conductive material 320, the compression limiter 310, or the fastener 315.

The method 800 can include coupling the apparatus 220 with a portion of the battery pack housing 205. For example, the through holes of the housing 305 can receive the fastener 315 such that a head portion of the fastener 315 is positioned above or proximate the top surface 325 and a threaded portion of the fastener 315 extends beyond the through hole (e.g., past the bottom surface 330) to engage with a portion of the housing 205 of the battery pack 110. The housing 305 can include four through holes that each receive a fastener 315. Each fastener 315 can be the same (e.g., in size or shape). One or more of the fasteners 315 can differ in size or shape, as another example.

The fastener 315 can be or can include various types of fasteners. For example, the fastener 315 can be a cutting fastener 315 (e.g., cutting screw or bolt, paint-cutting screw or bolt, self-tapping screw, machine screws, or another type of cutting fastener). The cutting fastener 315 can penetrate an outer coating (e.g., an E-coating, a layer of paint, powder coating, or another coating) of the battery pack housing 205. The cutting fastener 315 can include a sharp portion (e.g., a portion that can penetrate through the coating) to at least partially remove a portion of the coating layer when the fastener 315 is coupled with the housing 205.

When coupled with the housing 205 of the battery pack 110, the conductive path can form between the over-molded conductive material 320, the compression limiter 310, the fastener 315, and the housing 205. For example, an electrical connection is established between the over-molded conductive material 320, the compression limiter 310, the fastener 315, and the housing 205 such that electrical current can flow between one or more of the over-molded conductive material 320, the compression limiter 310, the fastener 315, and the housing 205.

The method 800 can include providing a gap at one or more portions between the fastener 315, the compression limiter 310, or the housing 205 of the battery pack 110. For example, an outer diameter of the fastener 315 can be less than or equal to an inner diameter of the through hole (e.g., an inner diameter of the portion of the compression limiter 310 that surrounds the inner diameter of the through hole) such that a gap 705 forms between the fastener 315 and the compression limiter 310. As another example, an aperture of the battery pack housing 205 that receives a portion of the fastener 315 can include a length that is greater than or equal to an axial length of a portion of the fastener 315 that is received within the aperture such that a gap 710 forms between an end portion of the fastener 315 and the end portion of the aperture. For example, the aperture can include one or more portions that do not make contact with the fastener 315 when the fastener 315 is coupled with the battery pack housing 205.

The fastener 315 can cause the coating to move into a portion of at least one gap. For example, the fastener 315 can cut through or push through the layer of material to cause particles, sediment, or other debris of the housing 205 to form around the fastener 315. The one or more gaps can receive a portion of the debris such that the debris does not interfere with the formation of the conductive path between the fastener 315, the battery pack housing 205, or the compression limiter 310. The one or more gaps can receive a portion of the debris such that the debris does not interfere with the seal 405, as another example.

Figure 9:
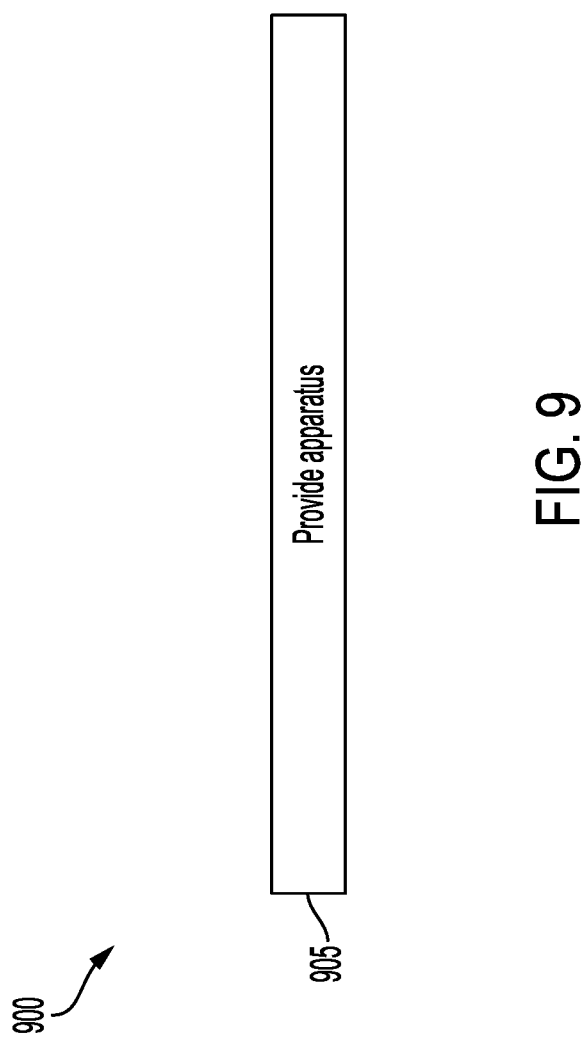
FIG. 9 depicts an example illustration of a process, in accordance with implementations.

FIG. 9 depicts an example method 900. The method 900 can include providing a header apparatus 220, as depicted in act 905. The apparatus 220 can be a header apparatus 220 (e.g., a connector apparatus). For example, the header apparatus 220 can be or can include one or more connectors, plugs, or receptacles capable of coupling one or more components (e.g., cables, busbars, or other components) with a high voltage ("HV") or high electrical interference system.

The header apparatus 220 can facilitate coupling one or more electrical components of the vehicle 105 with one or more components of the battery pack 110 such that electrical current or signals can flow between a component of the battery pack 110 and one or more electrical components of the vehicle 105 disposed outside of the battery pack housing 205.

The header apparatus 220 can include at least one housing 305. For example, the housing 305 can include one or more non-metallic materials that at least partially surround or couple one or more components of the apparatus 220 to one another. The housing 305 of the header apparatus 220 can include one or more portions that couple with the housing 205 of the battery pack 110, for example. The housing 305 can be formed from one or more materials including, but not limited to, plastics. The housing 305 can be formed in a variety of ways including, but not limited to, molding, extrusion, subtractive manufacturing, additive manufacturing, or other types of manufacturing. The housing 305 can include at least one through hole that can receive a fastener 315. The fastener 315 can facilitate coupling the housing 305 with a portion of a battery pack 110. For example, the fastener 315 can facilitate coupling the housing 305 with a portion of the housing 205 of the battery pack 110.

The housing 305 can include at least one compression limiter 310. The compression limiter 310 can be or can include one or more materials coupled with, or integrally formed with, the housing 305 to facilitate strengthening the apparatus 220 (e.g., the housing 305). For example, the compression limiter 310 can include at least one material that extends within a portion of a through hole to support the geometry of the through hole. The compression limiter 310 can include one or more conductive materials. For example the compression limiter 310 can be formed from one or more metals. The compression limiter 310 can include a conductive material such that a conductive path can be formed with one or more portions of the compression limiter 310. For example, the compression limiter 310 can include one or more materials that allow a path for current to flow when in contact with another conductive material. As an example, the compression limiter 310 can include one or more metals coupled with one or more plastic portions (e.g., through holes) of the housing 305.

The housing 305 can include at least one conductive material 320 coupled with a portion of the housing 305. For example, the conductive material 320 can be over-molded onto a portion of the housing 305. The over-molded conductive material 320 can be formed from one or more materials including, but not limited to, steel, aluminum, copper, brass, or other conductive materials. The over-molded conductive material 320 can include at least one material that extends within the housing 305 between the top surface 325 and a bottom surface 330 and at an angle to an axial direction of the through holes to support the geometry of the housing 305.

The over-molded conductive material 320 can over-mold onto a portion of the housing 305 such that at least a portion of the over-molded conductive material 320 conforms to a profile of a portion of the housing 305. For example, the over-molded conductive material 320 can at least partially match a portion of the housing 305. The over-molded conductive material 320 can form a conductive path between the fastener 315, the compression limiter 310, or the housing 205 of the battery pack 110.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure. For example, the header apparatus can be configured for use in various other systems or components including, but not limited to, a DC to AC inverter, an AC compressor, a heater, an air conditioner, any high voltage device, any high electrical interference device, an electrical system having an enclosure with E-coating or powder coating, a system having a faraday cage, a system using an enclosed cable, or various other electrical systems.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A header apparatus, comprising:
   a housing comprising a compression limiter;
   a cutting fastener coupled with a portion of the compression limiter;
   an over-molded conductive material configured to couple with the housing between a top surface and a bottom surface of the housing to form a conductive path between the compression limiter and the cutting fastener;
   a grounding shield coupled with the housing; and
   the grounding shield includes a protrusion configured to contact the over-molded conductive material.

2. The header apparatus of claim 1, comprising:
the cutting fastener configured to couple the housing with a portion of a battery pack housing to form the conductive path with the battery pack housing.

3. The header apparatus of claim 1, comprising:
the compression limiter including a through hole configured to receive a portion of the cutting fastener.

4. The header apparatus of claim 1, comprising:
the over-molded conductive material configured to at least partially conform to a profile of the housing.

5. The header apparatus of claim 1, comprising:
the cutting fastener configured to couple the housing with a portion of a battery pack housing to form the conductive path with the battery pack housing; and
the housing configured to form a liquid-tight seal with a portion of the battery pack housing.

6. The header apparatus of claim 1, comprising:
the cutting fastener configured to penetrate an outer coating of a portion of a battery pack housing to form the conductive path with the battery pack housing; and
a gap formed between a portion of the cutting fastener and the compression limiter configured to receive a portion of the outer coating.

7. A method, comprising:
providing a housing comprising a compression limiter;
coupling an over-molded conductive material with a portion of the compression limiter between a top surface and a bottom surface of the housing;
coupling a cutting fastener with a portion of the compression limiter to form a conductive path between the over-molded conductive material and the cutting fastener; and
contacting, by a protrusion of a grounding shield coupled with the housing, the over-molded conductive material.

8. The method of claim 7, comprising:
penetrating; by the cutting fastener, an outer coating of a battery pack housing to form the conductive path with the battery pack housing.

9. The method of claim 7, comprising:
coupling the cutting fastener with the portion of the compression limiter includes receiving; by a through hole of the compression limiter, a portion of the cutting fastener.

10. The method of claim 7, comprising:
the over-molded conductive material configured to at least partially conform to a profile of the housing.

11. The method of claim 7, comprising:
penetrating, by the cutting fastener, an outer coating of a battery pack housing to form the conductive path with the battery pack housing, and
sealing, by a seal, the housing with a portion of the battery pack housing.

12. The method of claim 7, comprising:
penetrating, by the cutting fastener, an outer coating of a battery pack housing to form the conductive path with the battery pack housing, and
receiving, by a gap formed between the cutting fastener and a portion of the battery pack housing, a portion of the outer coating.

13. An electric vehicle, comprising:
a header apparatus comprising:
a housing comprising a compression limiter,
a cutting fastener coupled with a portion of the compression limiter;
an over-molded conductive material configured to couple with the housing between a top surface and a bottom surface of the housing to form a conductive path between the compression limiter and the cutting fastener;
a grounding shield coupled with the housing; and
the grounding shield includes a protrusion configured to contact the over-molded conductive material.

14. The electric vehicle of claim 13, comprising:
the cutting fastener configured to couple the housing with a portion of a battery pack housing to form the conductive path with the battery pack housing.

15. The electric vehicle of claim 13, comprising:
the compression limiter including a through hole configured to receive a portion of the cutting fastener.

16. The electric vehicle of claim 13, comprising:
the over-molded conductive material configured to at least partially conform to a profile of the housing.

17. The electric vehicle of claim 13, comprising:
the cutting fastener configured to couple the housing with a portion of a battery pack housing to form the conductive path with the battery pack housing; and
the housing configured to form a liquid-tight seal with a portion of the battery pack housing.

18. The electric vehicle of claim 13, comprising:
the cutting fastener configured to penetrate an outer coating of a portion of a battery pack housing to form the conductive path with the battery pack housing; and
a gap formed between a portion of the cutting fastener and the compression limiter configured to receive a portion of the outer coating.

* * * * *